(12) United States Patent
Hara et al.

(10) Patent No.: US 6,292,846 B1
(45) Date of Patent: Sep. 18, 2001

(54) INTERACTIVE DATA TRANSMISSION SYSTEM INCLUDING INFORMATION RECORDING AND/OR REPRODUCTION APPARATUS CONNECTED TO AN ELECTRONIC CONTROL APPARATUS VIA A BUS

(75) Inventors: Mitsuhiko Hara, Yokohama; Takeshi Okauchi, Chigasaki, both of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/159,997

(22) Filed: Sep. 24, 1998

(30) Foreign Application Priority Data

Sep. 25, 1997 (JP) .................................................... 9-278040
Dec. 26, 1997 (JP) .................................................... 9-368309

(51) Int. Cl.⁷ .................................................. G06F 13/10
(52) U.S. Cl. .................................. 710/5; 710/58; 710/69; 360/79; 369/47; 386/40; 386/124
(58) Field of Search ................................... 710/5, 58, 69, 710/72; 360/15, 71, 79; 369/47, 84, 95; 386/124, 1, 33, 38, 40, 117

(56) References Cited

U.S. PATENT DOCUMENTS

| | | | | |
|---|---|---|---|---|
| 4,484,237 | * | 11/1984 | Muto | 360/25 |
| 4,890,316 | * | 12/1989 | Walsh et al. | 379/98 |
| 5,128,946 | * | 7/1992 | Ogino et al. | 371/37.4 |

(List continued on next page.)

FOREIGN PATENT DOCUMENTS

| | | |
|---|---|---|
| 0249482 | 12/1987 | (EP) . |
| 0601963 | 6/1994 | (EP) . |
| 0602581 | 6/1994 | (EP) . |
| 0659017 | 6/1995 | (EP) . |
| 0726674 | 8/1996 | (EP) . |
| 0738979 | 10/1996 | (EP) . |
| 0763947 | 3/1997 | (EP) . |
| 0781039 | 6/1997 | (EP) . |
| 0789489 | 8/1997 | (EP) . |
| 0812091 | 12/1997 | (EP) . |
| 0841776 | 5/1998 | (EP) . |
| 7-226025 | 8/1995 | (JP) . |
| 8-077647 | 3/1996 | (JP) . |
| 9-247607 | 9/1997 | (JP) . |
| WO 9710678 | 3/1997 | (WO) . |

\* cited by examiner

*Primary Examiner*—Thomas Lee
*Assistant Examiner*—Thuan Du
(74) *Attorney, Agent, or Firm*—Anderson, Kill & Olick, P.C.

(57) ABSTRACT

A control apparatus and a VTR are connected via an IEEE1394 interface bus. The control apparatus transmits a command to the VTR via the bus to designate a recording mode and a recording region of input information recorded on a magnetic tape loaded in the VTR. In response to this command, the VTR interprets the content of the received command and performs a recording operation in accordance with the interpreted content. Furthermore, the control apparatus transmits a recording time status command to an information transport apparatus to inquire a recording time of a specific information recorded on the magnetic tape. The information transport apparatus notifies the control apparatus of the recording time. The control apparatus calculates an expected information transport end time based on the information transport start time and the recording time of the specific information notified from the information transport apparatus. Then, the control apparatus starts transmitting a transport state command from a time earlier a predetermined time than the expected information transport end time. This transport state command inquires the operating condition of the information transport apparatus.

11 Claims, 18 Drawing Sheets

U.S. PATENT DOCUMENTS

| | | | |
|---|---|---|---|
| 5,182,762 | * | 1/1993 | Shirai et al. .......................... 375/122 |
| 5,206,738 | * | 4/1993 | Nishigaki et al. ................... 358/315 |
| 5,499,145 | * | 3/1996 | Azuma et al. ....................... 360/33.1 |
| 5,568,328 | * | 10/1996 | Takahashi et al. .................... 360/22 |
| 5,589,943 | | 12/1996 | Kozuki et al. . |
| 5,742,317 | * | 4/1998 | Kashihara ............................ 347/131 |
| 5,802,017 | | 9/1998 | Sato et al. . |
| 5,805,073 | * | 9/1999 | Nagano et al. ................. 340/825.07 |
| 5,923,814 | * | 7/1999 | Boyce ................................... 386/109 |
| 5,978,546 | * | 11/1999 | Abe et al. ............................ 386/124 |
| 6,031,677 | * | 2/2000 | Ono et al. .............................. 360/69 |
| 6,104,862 | * | 8/2000 | Amada et al. ....................... 386/103 |

FIG. 6A

| | msb | | | | | | | lsb |
|---|---|---|---|---|---|---|---|---|
| opcode | \multicolumn{8}{c}{MEDIA INFORMATION (DAh)} |
| operand[0] | \multicolumn{8}{c}{7Fh} |
| operand[1] | \multicolumn{8}{c}{7Fh} |

| | msb | lsb |
|---|---|---|
| opcode | MEDIA INFORMATION (DAh) | |
| operand[0] | 7Fh | |
| operand[1] | 7Fh | |

FIG. 6B

| | msb | lsb |
|---|---|---|
| opcode | MEDIA INFORMATION (DAh) | |
| operand[0] | CASSETTE TYPE | |
| operand[1] | TAPE GRADE AND RECORDING PROHIBITION | |

FIG. 7

| CASSETTE TYPE | TAPE GRADE AND RECORDING PROHIBITION | CONTENTS |
|---|---|---|
| DVC STANDARD CASSETTE (31h) | 30h | RECORDABLE |
| | 31h | RECORDING PROHIBITED |
| DVC COMPACT CASSETTE (32h) | 30h | RECORDABLE |
| | 31h | RECORDING PROHIBITED |
| VHS CASSETTE (22h) | 30h | VHS TAPE RECORDABLE |
| | 31h | VHS TAPE RECORDING PROHIBITED |
| | 40h | S-VHS TAPE RECORDABLE |
| | 41h | S-VHS TAPE RECORDING PROHIBITED |
| | 50h | D-VHS TAPE RECORDABLE |
| | 51h | D-VHS TAPE RECORDING PROHIBITED |
| VHS-C CASSETTE (23h) | 30h | VHS TAPE RECORDABLE |
| | 31h | VHS TAPE RECORDING PROHIBITED |
| | 40h | S-VHS TAPE RECORDABLE |
| | 41h | S-VHS TAPE RECORDING PROHIBITED |
| NO CASSETTE (60h) | 7Fh | |
| UNKNOWN CASSETTE (7Eh) | 7Fh | |

FIG. 8A

| | msb | | | | | | | lsb |
|---|---|---|---|---|---|---|---|---|
| opcode | \multicolumn{8}{c|}{INPUT SIGNAL MODE (79h)} |
| operand[0] | \multicolumn{8}{c|}{SIGNAL MODE} |

FIG. 8B

| | msb | | | | | | | lsb |
|---|---|---|---|---|---|---|---|---|
| opcode | \multicolumn{8}{c|}{INPUT SIGNAL MODE (79h)} |
| operand[0] | \multicolumn{8}{c|}{FFh} |

FIG. 9

| VALUE | INPUT SIGNAL MODE |
|---|---|
| 00h | SD 525 / 60 |
| 04h | SDL 525 / 60 |
| 08h | HD 1125 / 60 |
| 80h | SD 625 / 50 |
| 84h | SDL 625 / 50 |
| 88h | HD 1250 / 50 |
| 10h | MPEG 25Mbps-60 |
| 14h | MPEG 12.5Mbps-60 |
| 18h | MPEG 6.25Mbps-60 |
| 90h | MPEG 25Mbps-50 |
| 94h | MPEG 12.5Mbps-50 |
| 98h | MPEG 6.25Mbps-50 |
| 01h | D-VHS DIGITAL |
| 05h | ANALOG VHS NTSC 525 / 60 |
| 25h | ANALOG VHS M-PAL 525 / 60 |
| A5h | ANALOG VHS PAL 625 / 50 |
| B5h | ANALOG VHS N-PAL 625 / 50 |
| C5h | ANALOG VHS SECAM 625 / 50 |
| D5h | ANALOG VHS ME-SECAM 625 / 50 |
| 0Dh | ANALOG S-VHS 525 / 60 |
| EDh | ANALOG S-VHS 625 / 50 |

FIG. 10A

| | msb | | | | | | | lsb |
|---|---|---|---|---|---|---|---|---|
| opcode | | RECORDING SPEED (DBh) | | | | | | |
| operand[0] | | RECORDING SPEED | | | | | | |

FIG. 10B

| | msb | | | | | | | lsb |
|---|---|---|---|---|---|---|---|---|
| opcode | | RECORDING SPEED (DBh) | | | | | | |
| operand[0] | | 7Fh | | | | | | |

FIG. 11A

| RECORDING SPEED | VALUE | CONTENTS |
|---|---|---|
| SPEED 32 | 20h | 6.67 μm TRACK PITCH |
| STANDARD SPEED | 6Fh | 10 μm TRACK PITCH |

FIG. 11B

| RECORDING SPEED | VALUE | CONTENTS |
|---|---|---|
| STANDARD SPEED | 6Fh | 29 μm TRACK PITCH FOR D-VHS |

FIG. 11C

| RECORDING SPEED | VALUE | CONTENTS |
|---|---|---|
| SPEED 33 | 21h | EP MODE FOR VHS |
| SPEED 32 | 20h | LP MODE FOR VHS |
| STANDARD SPEED | 6Fh | SP MODE FOR VHS |

FIG. 12

| | msb | | | | | | | lsb |
|---|---|---|---|---|---|---|---|---|
| opcode | TAPE RECORDING FORMAT (D2h) | | | | | | | |
| operand[0] | MEDIA TYPE | | | | | | | |
| operand[1] | FORMAT PARAMETER | | | | | | | |
| ... | | | | | | | | |
| operand[8] | | | | | | | | |

FIG. 13

| | msb | | | | | | | lsb |
|---|---|---|---|---|---|---|---|---|
| opcode | TAPE RECORDING FORMAT (D2h) | | | | | | | |
| operand[0] | 00001b | | | | | af[0] | af[1] | af[2] |
| operand[1] | af[3] | af[4] | af[5] | af[6] | af[7] | af[8] | af[9] | EXTENSION CODE "A" |
| operand[2] | EXTENSION CODE "B" | | | | | | | |
| operand[3] | ECC BLOCK SIZE | ECC BLOCK NUMBER | | PROGRAM MODE | | | SCANNER ROTATION SPEED | |
| operand[4] | 1.001 FLAG | OUTER INTERLEAVE | | RECORDING MODE | | | | |
| operand[5] | RESERVE | | | | | | | |
| operand[6] | APPLICATION ID | | | | RESERVE | | | |
| operand[7] | RESERVE | APPLICATION ID DETAILED INFORMATION | | | TIME-AXIS COMPRESSION RATE | | | |
| operand[8] | RESERVE | | | | | | | |

FIG. 14A

| | msb | | | | | | | lsb |
|---|---|---|---|---|---|---|---|---|
| Opcode | \multicolumn{8}{c|}{AREA MODE (72h)} |
| Operand[0] | \multicolumn{4}{c|}{MEDIA TYPE} | \multicolumn{4}{c|}{AREA NUMBER} |
| Operand[1] | \multicolumn{2}{c|}{part[0]} | \multicolumn{2}{c|}{part[1]} | \multicolumn{2}{c|}{part[2]} | \multicolumn{2}{c|}{part[3]} |
| Operand[2] | \multicolumn{2}{c|}{part[4]} | \multicolumn{2}{c|}{part[5]} | \multicolumn{2}{c|}{part[6]} | \multicolumn{2}{c|}{part[7]} |
| Operand[3] | \multicolumn{8}{c|}{FFh} |
| Operand[4] | \multicolumn{8}{c|}{FFh} |

FIG. 14B

| | msb | | | | | | | lsb |
|---|---|---|---|---|---|---|---|---|
| Opcode | \multicolumn{8}{c|}{AREA MODE (72h)} |
| Operand[0] —[4] | \multicolumn{8}{c|}{FFh} |

FIG. 15

| AREA NUMBER | RECORDING REGION | CONTENTS | | |
|---|---|---|---|---|
| | | DVC | D-VHS | VHS |
| 0 | AREA 0 | ITI SECTOR | CONTROL TRACK | CONTROL TRACK |
| 1 | AREA 1 | AUDIO SECTOR | LINEAR AUDIO TRACK | LINEAR AUDIO TRACK |
| 2 | AREA 2 | VIDEO SECTOR | MAIN CODE AREA | VIDEO TRACK |
| 3 | AREA 3 | SUB CODE SECTOR | SUB CODE AREA | |
| 4 | AREA 4 | UNDEFINED | UNDEFINED | UNDEFINED |
| 5 | AREA 5 | | | |
| 6 | AREA 6 | | | |
| 7 | AREA 7 | | | |

FIG. 16

|          | DVC | D-VHS | VHS |
|----------|-----|-------|-----|
| AREA 2+3 | VIDEO SECTOR+<br>SUB CODE SECTOR | MAIN CODE AREA+<br>SUB CODE AREA | UNDEFINED |
| AREA 1+2+3 | VIDEO SECTOR+<br>AUDIO SECTOR+<br>SUB CODE SECTOR | LINEAR AUDIO TRACK+<br>MAIN CODE AREA+<br>SUB CODE AREA | UNDEFINED |
| AREA 1+2 | AUDIO SECTOR+<br>VIDEO SECTOR | LINEAR AUDIO TRACK+<br>MAIN CODE AREA | LINEAR AUDIO TRACK+<br>VIDEO TRACK |
| AREA 1+3 | AUDIO SECTOR+<br>SUB CODE SECTOR | LINEAR AUDIO TRACK+<br>SUB CODE AREA | UNDEFINED |

FIG. 17

| | msb lsb |
|---|---|
| opcode | RECORDING (C2h) |
| operand[0] | RECORDING MODE |

FIG. 18

| RECORDING MODE | VALUE | CONTENTS |
|---|---|---|
| AREA 2+3 INSERT | 31h | REWRITING OF DESIGNATED REGION OMLY |
| AREA 1 INSERT | 32h | |
| AREA 1+2+3 INSERT | 33h | |
| AREA 3 INSERT | 34h | |
| AREA 2 INSERT | 36h | |
| AREA 1+2 INSERT | 37h | |
| AREA 1+3 INSERT | 38h | |
| AREA 2+3 INSERT POSE | 41h | POSE AT REWRITING MODE OF DESIGNATED REGION ONLY |
| AREA 1 INSERT POSE | 42h | |
| AREA 1+2+3 INSERT POSE | 43h | |
| AREA 3 INSERT POSE | 44h | |
| AREA 2 INSERT POSE | 46h | |
| AREA 1+2 INSERT POSE | 47h | |
| AREA 1+3 INSERT POSE | 48h | |
| RECORDING | 75h | OVERWRITE OF ENTIRE REGION |
| RECORDING POSE | 7Dh | POSE AT OVERWRITING MODE OF ENTIRE REGION |

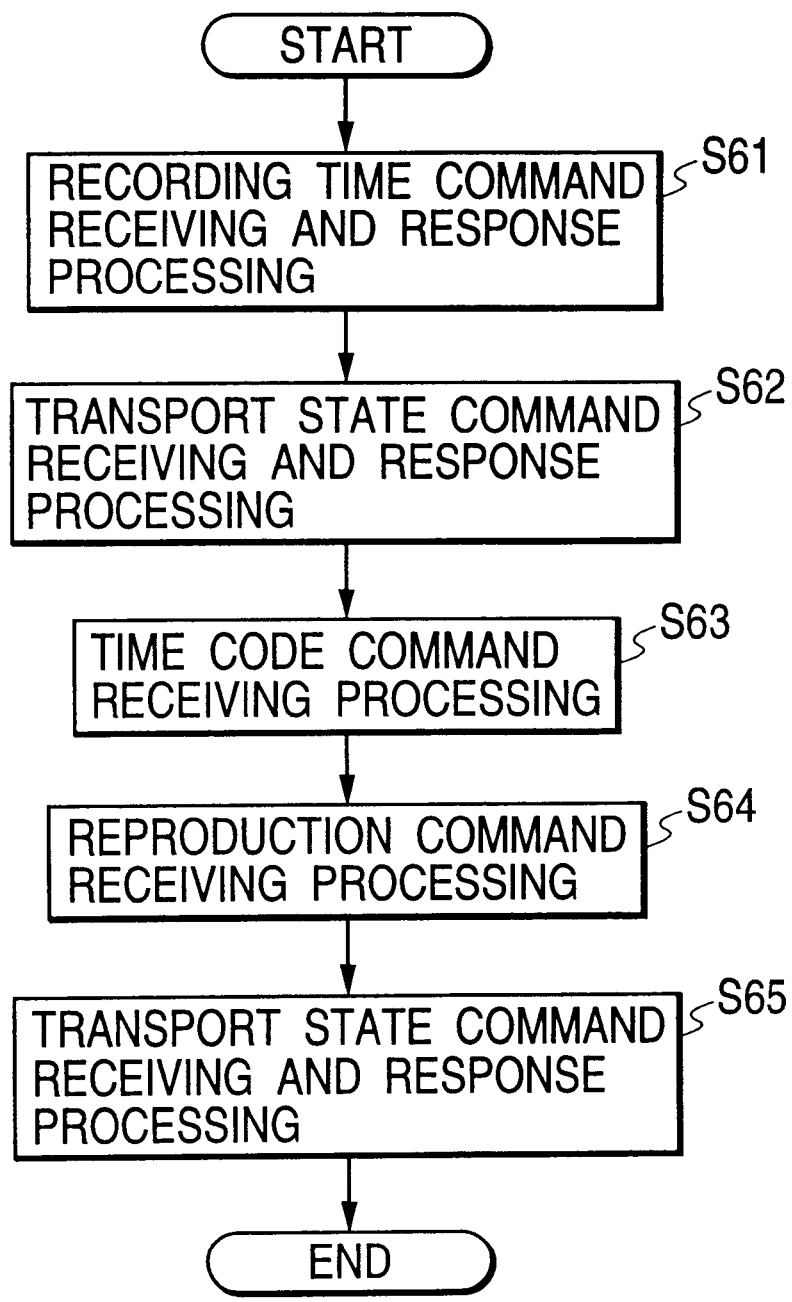

FIG. 23A

| | msb | | | | | | | lsb |
|---|---|---|---|---|---|---|---|---|
| Opcode | \multicolumn{8}{c|}{RECORDING TIME (54h)} |
| Operand[0] | \multicolumn{8}{c|}{71h} |
| Operand[1]–[4] | \multicolumn{8}{c|}{FFh} |

FIG. 23B

| | msb | | | | | | | lsb |
|---|---|---|---|---|---|---|---|---|
| Opcode | RECORDING TIME (54h) | | | | | | | |
| Operand[0] | 71h | | | | | | | |
| Operand[1] | × | | FRAME | | | | | |
| Operand[2] | × | | SECOND | | | | | |
| Operand[3] | × | | MINUTE | | | | | |
| Operand[4] | × | | HOUR | | | | | |

FIG. 24A

| | msb | | | | | | | lsb |
|---|---|---|---|---|---|---|---|---|
| opcode | | | TRANSPORT STATE (D0h) | | | | | |
| operand[0] | | | 7Fh | | | | | |

FIG. 24B

| | msb | | | | | | | lsb |
|---|---|---|---|---|---|---|---|---|
| opcode | | | TRANSPORT MODE | | | | | |
| operand[0] | | | TRANSPORT STATE | | | | | |

FIG. 25

| TRANSPORT MODE | TRANSPORT STATE | VALUE | EXPLANATION |
|---|---|---|---|
| MEDIA LOADING (C1h) | EJECT | 60h | NO MEDIA LOADED |
| RECORDING (C2h) | ORDINARY RECORDING | 75h | |
| | INSERT | 30h | INSERT MODE SELECTED |
| | INSERT POSE | 40h | INSERT POSE MODE SELECTED |
| REPRODUCTION (C3h) | ORIDINARY REPRODUCTION | 75h | |
| | SLOW (FORWARD) | 31h | SLOW (FORWARD) MODE SELECTED |
| | SEARCH (FORWARD) | 3Fh | SEARCH (FORWARD) MODE SELECTED |
| | SLOW (BACKWARD) | 41h | SLOW (BACKWARD) MODE SELECTED |
| | SEARCH (BACKWARD) | 4Fh | SEARCH (BACKWARD) MODE SELECTED |
| WIND (C4h) | STOP | 60h | |
| | REWIND | 65h | |
| | FAST FORWARDING | 75h | |
| | EMERGENCY STOP | 30h | ENFORCED STOP |
| | CONDENSATION STOP | 31h | STOP BY DEW CONDENSATION |

FIG. 26A

| | msb | | | | | | | lsb |
|---|---|---|---|---|---|---|---|---|
| Opcode | TIME CODE (51h) ||||||||
| Operand[0] | 20h ||||||||
| Operand[1] | FRAME ||||||||
| Operand[2] | SECOND ||||||||
| Operand[3] | MINUTE ||||||||
| Operand[4] | HOUR ||||||||

FIG. 26B

| | msb | | | | | | | lsb |
|---|---|---|---|---|---|---|---|---|
| Opcode | TIME CODE (51h) ||||||||
| Operand[0] | 71h ||||||||
| Operand[1]—[4] | FFh ||||||||

FIG. 27

| | msb | | | | | | | lsb |
|---|---|---|---|---|---|---|---|---|
| Opcode | REPRODUCTION (C3h) ||||||||
| Operand[0] | REPRODUCTION MODE ||||||||

FIG. 28

| | msb | | | | | | | lsb |
|---|---|---|---|---|---|---|---|---|
| Opcode | WIND (C4h) ||||||||
| Operand[0] | WIND MODE ||||||||

INTERACTIVE DATA TRANSMISSION SYSTEM INCLUDING INFORMATION RECORDING AND/OR REPRODUCTION APPARATUS CONNECTED TO AN ELECTRONIC CONTROL APPARATUS VIA A BUS

BACKGROUND OF THE INVENTION

The present invention relates to an interactive data transmission system including an information recording and/or reproduction apparatus connected via a bus for transmitting digital signals, and relates to a control method of this interactive data transmission system.

An interface bus, standardized according to IEEE 1394 (hereinafter referred to as a 1394 interface bus), is known as a high performance interface bus capable of realizing a data transmission rate exceeding 100 Mbps (Mbit/sec) and transmitting both video information and audio information in addition to control information.

This kind of high performance interface bus is preferably used for connecting an information recording and/or reproduction apparatus, such as VTR (video tape recorder), and an external electronic apparatus, such as a personal computer, to constitute an interactive data transmission system. Among various commands used in this interactive data transmission system, a command may be sent from the external recording apparatus to designate a tape speed during recording. Other command may relate to a judgement as to whether the signal to be recorded is a standard definition (SD) signal or a high definition (HD) signal.

However, it was impossible to designate a type of a cassette or a grade of a magnetic tape from an external electronic apparatus when a VTR has a plurality types of loadable (compatible) cassettes. For example, different kinds of cassettes, such as VHS (registered trademark) cassettes, VHS-C (registered trademark) cassettes and S-VHS (registered trademark) cassettes, are loadable in a VTR conforming to a D-VHS (registered trademark) standards. Furthermore, magnetic tapes accommodated in these different cassettes are classified into a plurality of grades, such as VHS tape, S-VHS (registered trademark) tape, D-VHS tape.

Furthermore, it was impossible for an external electronic apparatus to designate a recording by analog signals because there was a premise that the input information recordable on a magnetic tape by the information recording and/or reproduction apparatus was limited to digital data.

Furthermore, according to a VTR conforming to the D-VHS standards or the DVC standards (refer to Published Japanese Patent Application No. Kokai 7-226025), a recording region on its magnetic tape is divided into a plurality of regions including a recording region storing control information and a recording region storing main information corresponding to video and audio input information. However, it was impossible for an external electronic apparatus to designate a specific part of the divided regions on which the data are recorded (rewritten).

Furthermore, the above-described high performance interface bus can be used for connecting an information transport apparatus reproducing information recorded in a recording media, such as VTR, and an electronic apparatus, such as other VTR or a personal computer, to constitute an electronic data transmission system. Among various commands used in this electronic system, a command may be sent from other electronic apparatus to the information transport apparatus to inquire an operating condition (stopped or operated) of the information transport apparatus. Other command may be a transport state command returned from the information transport apparatus for responding to the received inquiry.

However, the 1394 interface bus does not restrict the transmission timing of the above-described transport state command for inquiring the operating condition of other electronic apparatus via the bus. This allows flexible and occasional inquiries. However, the following problems arise.

When an information transport apparatus starts transmitting a specific information (e.g., one movie program), it is important for an electronic apparatus connected to the information transport apparatus via a bus to correctly know an end time of the transmission of this specific information. To this end, it is necessary to transmit the transport state command at relatively short intervals and receive a response from the information transport apparatus. For example, it is now assumed that the information transport apparatus transmits a program of two hours (i.e., 120 minutes). When the transmission interval of the transport state command is set to 7 minutes, the number of required transmission of the transport state command is 18 times until the end of the data transmission is detected. Furthermore, there is a delay time of 6 minutes, between the actual end time of the data transmission and the detected time, due to a dormant period between the seventeenth command transmission (occurring at a 119 minutes point) and the eighteenth command transmission (occurring at a 126 minutes point). This delay time of 6 minutes will force a recording apparatus to operate unnecessarily.

SUMMARY OF THE INVENTION

In view of the foregoing problems, the present invention has an object to provide an information recording system allowing an external electronic apparatus to perform various controls finely and precisely so as to improve its usability when the external electronic apparatus is connected via a digital interface bus to this information recording apparatus, and also to provide a control method for this system.

Another object of the present invention is to provide an electronic data transmission system and a related control method capable of adequately detecting an operating condition of an information transport apparatus via a bus.

In order to accomplish the above and other related objects, one aspect of the present invention provides an information recording system comprising an information recording apparatus for recording input information on a recording media and at least one external electronic apparatus connected to the information recording apparatus via a bus for transmitting digital signals. The external electronic apparatus comprises a command transmitting means for sending a command to the information recording apparatus via the bus. This command designates at least one of a recording mode according to which the input information is recorded on the recording media and a recording region of the recording media on which the input information is recorded. The information recording apparatus comprises a command receiving means for receiving the command sent from the external electronic apparatus and interpreting the content of the received command, and a control means for performing a control according to the interpreted command.

Preferably, the information recording apparatus is capable of recording both digital signals and analog signals on the recording media. The recording mode designating command designates digital signal or analog signal as signal form to be recorded on the recording media.

Preferably, the recording mode designating command includes at least one selected from the group consisting of type information of the recording media, error-correcting code information, structure information of input digital data, recording time information, data rate information of the input digital data, and time-axis compression rate information of the input digital data.

Preferably, the recording region of the recording media includes an input information recording region for recording the input information and a control information region for recording control information required for recording and reproducing the recording media.

Another aspect of the present invention provides an information recording system comprising an information recording apparatus for recording input information on a recording media and at least one external electronic apparatus connected to the information recording apparatus via a bus for transmitting digital signals. The external electronic apparatus comprises a command transmitting means for sending an inquiry command to the information recording apparatus via the bus. This inquiry command inquires at least one of a type information of the recording media loaded in the information recording apparatus and a recording prohibit information of an entire or a partial region of the loaded recording media. The information recording apparatus comprises a command receiving means for receiving the inquiry command sent from the external electronic apparatus and interpreting the content of the received command, and a response transmitting means for sending a response replying to the interpreted command content to the external electronic apparatus via the bus.

Another aspect of the present invention provides an external electronic apparatus connected via a bus for transmitting digital signals to an information recording apparatus that records input information on a recording media. This external electronic apparatus comprises a command transmitting means for sending a command to the information recording apparatus via the bus. This command designates at least one of a recording mode according to which the input information is recorded on the recording media and a recording region of the recording media on which the input information is recorded.

Another aspect of the present invention provides an information recording apparatus for recording input information on a recording media, connectable to an external electronic apparatus via a bus for transmitting digital signals. The information recording apparatus comprises a command receiving means for receiving a command sent from the external electronic apparatus and interpreting the content of the received command. This command designates at least one of a recording mode according to which the input information is recorded on the recording media and a recording region of the recording media on which the input information is recorded. The information recording apparatus further comprises a control means for performing a control according to the interpreted command.

Another aspect of the present invention provides an information recording apparatus for recording input information on a recording media, connectable to an external electronic apparatus via a bus for transmitting digital signals. The information recording apparatus comprises a command receiving means for receiving an inquiry command sent from the external electronic apparatus and interpreting the content of the received command. This inquiry command inquires at least one of a type information of the recording media loaded in the information recording apparatus and a recording prohibit information of an entire or a partial region of the loaded recording media. The information recording apparatus further comprises a response transmitting means for sending a response replying to the interpreted command content to the external electronic apparatus via the bus.

Another aspect of the present invention provides a control method for an information recording system comprising an information recording apparatus for recording input information on a recording media and at least one external electronic apparatus connected to the information recording apparatus via a bus for transmitting digital signals. The control method comprises a command transmitting step of causing said external electronic apparatus to send a command to the information recording apparatus via the bus. This command designates at least one of a recording mode according to which the input information is recorded on the recording media and a recording region of the recording media on which the input information is recorded. The control method comprises a command receiving step of causing said information recording apparatus to receive the command sent from the external electronic apparatus and interpret the content of the received command. The control method comprises a control step of causing said information recording apparatus to perform a control according to the interpreted command.

Another aspect of the present invention provides a control method for an information recording system comprising an information recording apparatus for recording input information on a recording media and at least one external electronic apparatus connected to the information recording apparatus via a bus for transmitting digital signals. The control method comprises a command transmitting step of causing said external electronic apparatus to send an inquiry command to the information recording apparatus via the bus. This inquiry command inquires at least one of a type information of the recording media loaded in the information recording apparatus and a recording prohibit information of an entire or a partial region of the loaded recording media. The control method comprises a command receiving step of causing the information recording apparatus to receive the inquiry command sent from the external electronic apparatus and interpret the content of the received command. The control method causes the information recording apparatus to return a response replying to the interpreted command content to the external electronic apparatus via the bus.

Furthermore, another aspect of the present invention provides an electronic data transmission system comprising at least one electronic apparatus and an information transport apparatus connected to the electronic apparatus via a bus transmitting digital signals for reading information recorded on a recording media and transmitting the readout information. The electronic apparatus comprises a command transmitting means for transmitting inquiry commands to the information transport apparatus via the bus. The inquiry commands include a transport time inquiring command for inquiring a time required for transmitting a specific information and an operating condition inquiring command for inquiring an operating condition of the information transport apparatus. The information transport apparatus comprises a command receiving means for receiving the inquiry command sent from the electronic apparatus and interpreting the content of the received command, and a response transmitting means for transmitting a response replying to the interpreted command via the bus to the electronic apparatus. The command transmitting means is for calculating an expected information transport end time based on information relating to a time required for transmitting the specific information involved in the response returned from the information transport apparatus and for starting transmitting the operating condition inquiring command at a just before end time a predetermined time earlier than the obtained expected information transport end time.

Preferably, the command transmitting means is for continuously transmitting the operating condition inquiring command until the transmission of the specific information is actually completed.

Another aspect of the present invention provides an electronic data transmission system comprising at least one electronic apparatus and an information transport apparatus connected to the electronic apparatus via a bus transmitting digital signals for reading information recorded on a recording media and transmitting the readout information. The electronic apparatus comprises a command transmitting means for transmitting inquiry commands to the information transport apparatus via the bus. The inquiry commands include a transport time inquiring command for inquiring a time required for transmitting a specific information and an operating condition inquiring command for inquiring an operating condition of the information transport apparatus. The information transport apparatus comprises a command receiving means for receiving the inquiry command sent from the electronic apparatus and interpreting the content of the received command, and a response transmitting means for transmitting a response replying to the interpreted command via the bus to the electronic apparatus. The command transmitting means is for calculating an expected information transport end time based on information relating to a time required for transmitting the specific information involved in the response returned from the information transport apparatus and for changing transmitting intervals of the operating condition inquiring command after a just before end time a predetermined time earlier than the expected information transport end time. The changed transmitting intervals are shorter than transmitting intervals being set before the just before end time.

Another aspect of the present invention provides a control method for an electronic data transmission system comprising at least one electronic apparatus and an information transport apparatus connected to the electronic apparatus via a bus transmitting digital signals for reading information recorded on a recording media and transmitting the readout information. The control method comprises a transport time inquiring step of causing the electronic apparatus to transmit a transport time inquiring command to the information transport apparatus via the bus for inquiring a time required for transmitting a specific information. The control method comprises an operating condition inquiring step of causing the electronic apparatus to transmit an operating condition inquiring command to the information transport apparatus via the bus for inquiring an operating condition of the information transport apparatus. The control method comprises a command receiving step of causing the information transport apparatus to receive the inquiry command sent from the electronic apparatus and interpret the content of the received command. The control method comprises a response returning step of causing the information transport apparatus to transmit a response replying to the interpreted command to the electronic apparatus via the bus. The control method comprises a calculating step of causing the electronic apparatus to calculate an expected information transport end time based on information relating to a time required for transmitting the specific information involved in the response returned from the information transport apparatus. The electronic apparatus starts transmitting the operating condition inquiring command at a just before end time a predetermined time earlier than the obtained expected information transport end time.

Another aspect of the present invention provides a control method for an electronic data transmission system comprising at least one electronic apparatus and an information transport apparatus connected to the electronic apparatus via a bus transmitting digital signals for reading information recorded on a recording media and transmitting the readout information. The control method comprises a transport time inquiring step of causing the electronic apparatus to transmit a transport time inquiring command to the information transport apparatus via the bus for inquiring a time required for transmitting a specific information. The control method comprises an operating condition inquiring step of causing the electronic apparatus to transmit an operating condition inquiring command to the information transport apparatus via the bus for inquiring an operating condition of the information transport apparatus. The control method comprises a command receiving step of causing the information transport apparatus to receive the inquiry command sent from the electronic apparatus and interpret the content of the received command. The control method comprises a response returning step of causing the information transport apparatus to transmit a response replying to the interpreted command to the electronic apparatus via the bus. The control method comprises a calculating step of causing the electronic apparatus to calculate an expected information transport end time based on information relating to a time required for transmitting the specific information involved in the response returned from the information transport apparatus. The electronic apparatus changes transmitting intervals of the operating condition inquiring command after a just before end time a predetermined time earlier than the obtained expected information transport end time, and the changed transmitting intervals are shorter than transmitting intervals being set before the just before end time.

BRIEF DESCRIPTION OF THE DRAWINGS

The above and other objects, features and advantages of the present invention will become more apparent from the following detailed description which is to be read in conjunction with the attached drawings, in which:

FIGS. 6A and 6B are views showing the arrangement of medium information commands used in the first embodiment of the present invention;

FIG. 7 is a view illustrating operand values of the medium information commands and their contents in accordance with the first embodiment of the present invention;

FIGS. 8A and 8B are views showing the arrangement of input signal mode commands used in the first embodiment of the present invention;

FIG. 9 is a view illustrating operand values of the input signal mode commands and their contents in accordance with the first embodiment of the present invention;

FIGS. 10A and 10B are views showing the arrangement of recording speed commands used in the first embodiment of the present invention;

FIGS. 11A, 11B and 11C are views illustrating operand values of the recording speed commands and their contents used in the first embodiment of the present invention;

FIG. 12 is a view showing the arrangement of a tape recording format command used in the first embodiment of the present invention;

FIG. 13 is a view showing details of the tape recording format command used in the first embodiment of the present invention;

FIGS. 14A and 14B are views showing the arrangement of area mode commands used in the first embodiment of the present invention;

FIG. 15 is a view illustrating a relationship between an area number of the area mode command and a corresponding recording region on the magnetic tape in accordance with the first embodiment of the present invention;

FIG. 16 is a view showing examples of combined recording regions used in the first embodiment of the present invention;

FIG. 17 is a view showing the arrangement of a recording command used in the first embodiment of the present invention;

FIG. 18 is a view illustrating operand values of the recording commands and their contents used in the first embodiment of the present invention;

FIG. 22 is a flowchart showing the control processing performed in another VTR shown in FIG. 2 in accordance with the second embodiment of the present invention;

FIGS. 23A and 23B are views showing the arrangement of recording time commands used in the second embodiment of the present invention;

FIGS. 24A and 24B are views showing the arrangement of transport state commands used in the second embodiment of the present invention;

FIG. 25 is a view illustrating operand values of the transport state commands and their contents used in the second embodiment of the present invention;

FIGS. 26A and 26B are views showing the arrangement of time code commands used in the second embodiment of the present invention;

FIG. 27 is a view showing the arrangement of a reproduction command used in the second embodiment of the present invention; and FIG. 28 is a view showing the arrangement of a wind command used in the second embodiment of the present invention.

DESCRIPTION OF THE PREFERRED EMBODIMENTS

Figure 1:
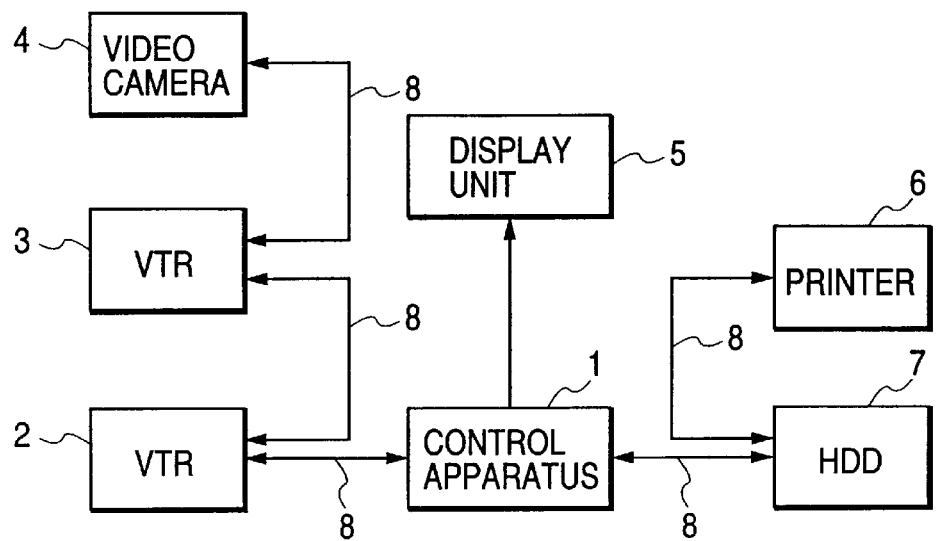
FIG. 1 is a block diagram showing a schematic arrangement of an interactive data transmission system in accordance with the present invention.

Hereinafter, preferred embodiments of the present invention will be explained with reference to the attached drawings. Identical parts are denoted by the same reference numerals throughout the views.

First Embodiment

FIG. 1 is a block diagram showing a schematic arrangement of an interactive data transmission system in accordance with a first embodiment of the present invention. This system comprises a control apparatus 1 constituted by a personal computer, a VTR 2 conforming to the D-VHS standards, another VTR 3 conforming to the DVC standards, a video camera 4, a display unit 5, a hard disk drive (HDD) 7, and a printer 6. A 1394 interface bus 8 connects the control apparatus 1, the VTRs 2 and 3, the video camera 4, the HDD 7, and the printer 6 to allow a two-way (i.e., bidirectional) digital communication between them.

Figure 2:
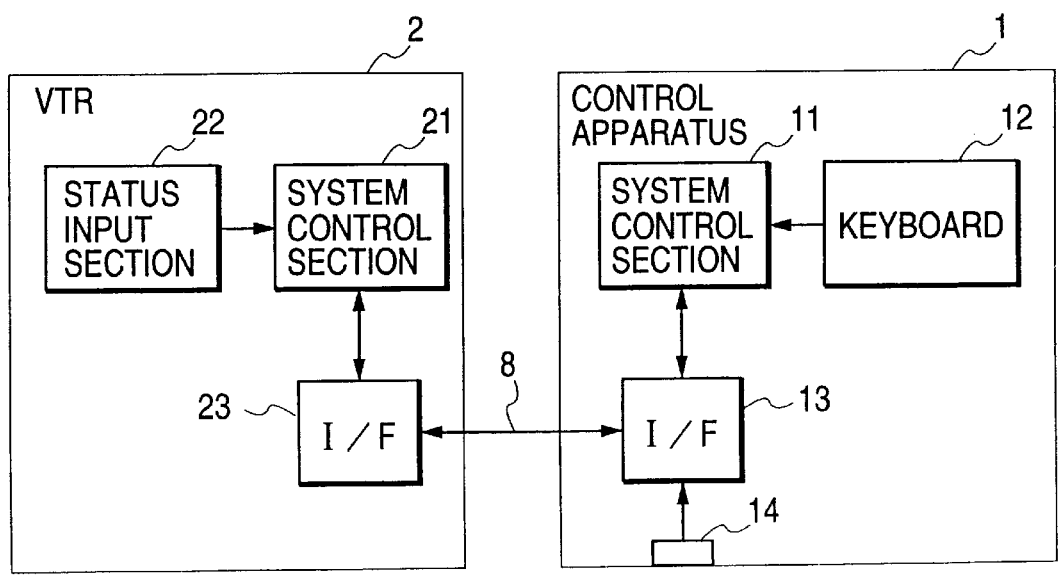
FIG. 2 is a block diagram showing details of part of the interactive data transmission system shown in FIG. 1.

FIG. 2 is a block diagram showing a detailed arrangement of the control apparatus 1 and the VTR 2 shown in FIG. 1. The control apparatus 1 comprises a keyboard 12 used by an operator, a system control section 11 performing an overall control of the control apparatus 1, an interface 13 connected to the 1394 interface bus 8 for performing the communication, and an AV input terminal 14 through which various digital signals including video and audio data are entered into the control apparatus 1. The VTR 2 comprises a system control section 21 performing an overall control of the VTR 2, a status input section 22 inputting various information to the system control section 21, and an interface 23 connected to the 1394 interface bus 8 for performing the communication. The status input section 22 detects a type of a tape cassette loaded in the VTR 2, checks whether the recording is inhibited, and identifies a grade (VHS, S-VHS, or D-VHS) of a magnetic tape accommodated in the loaded cassette tape. The data obtained by the status input section 22 are entered into the system control section 21. Furthermore, information required for setting a tape traveling speed (i.e., recording speed) during recording is entered from the status input section 22 into the system control section 21. The VTR 2 has an AV input terminal through which various digital and audio signals including video and audio data are entered into the VTR 2.

The control apparatus 1 supplies video signals and audio signals (or digital signals other than audio data) to the VTR 2. A recording of the supplied data in the VTR 2 is controlled by the control apparatus 1. The operation of the interactive data transmission system shown in FIG. 2 will be explained in more detail.

Figure 3:
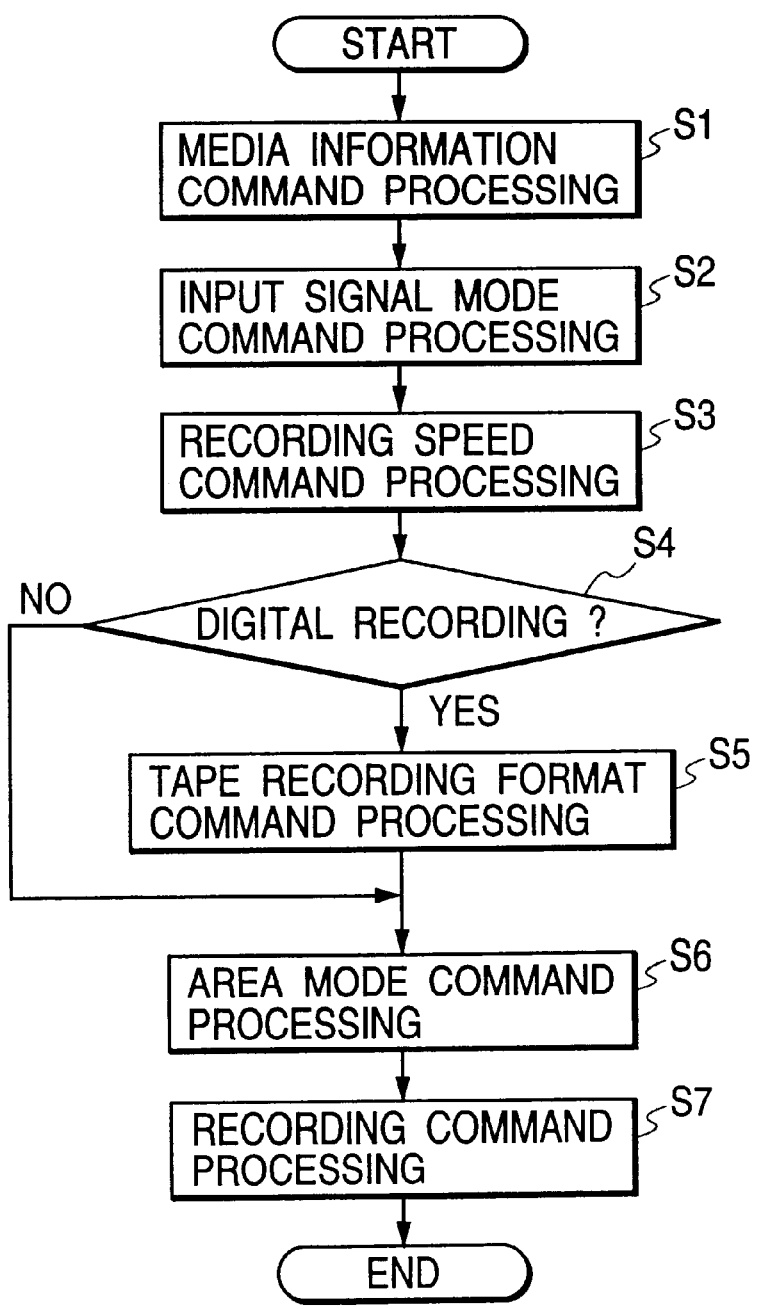
FIG. 3 is a flowchart showing the control processing performed in a control apparatus shown in FIG. 2 in accordance with a first embodiment of the present invention.
Figure 4:
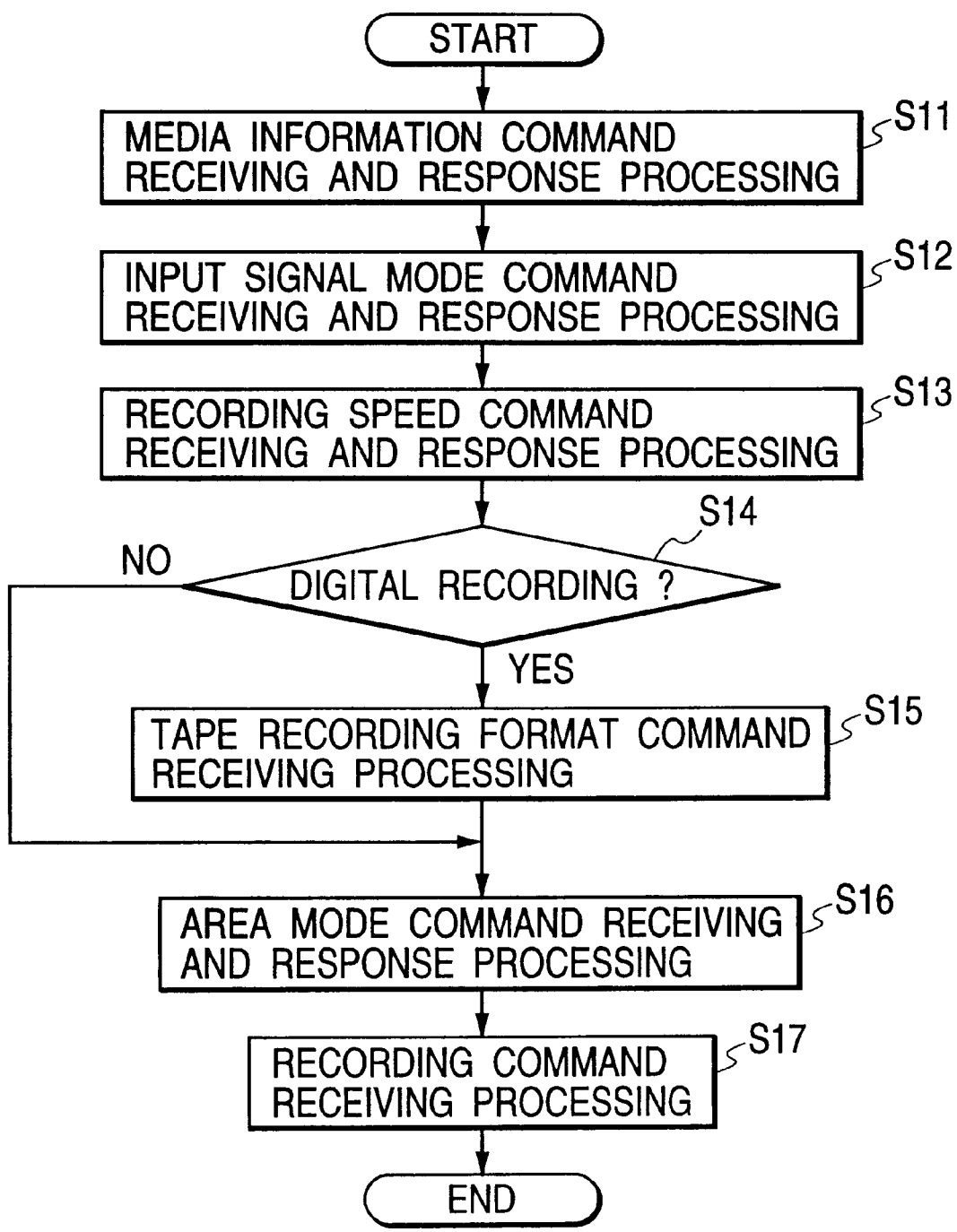
FIG. 4 is a flowchart showing the control processing performed in a VTR shown in FIG. 2 in accordance with the first embodiment of the present invention.
Figure 5A:
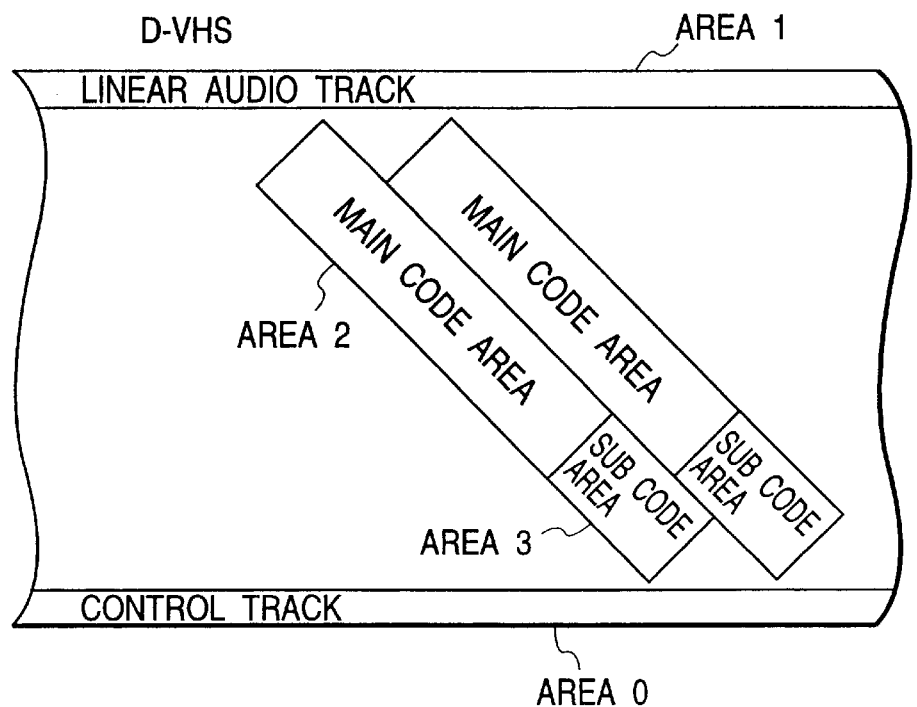
FIGS. 5A and 5B are views showing recording regions on a magnetic tape in accordance with-the first embodiment of the present invention.
Figure 5B:
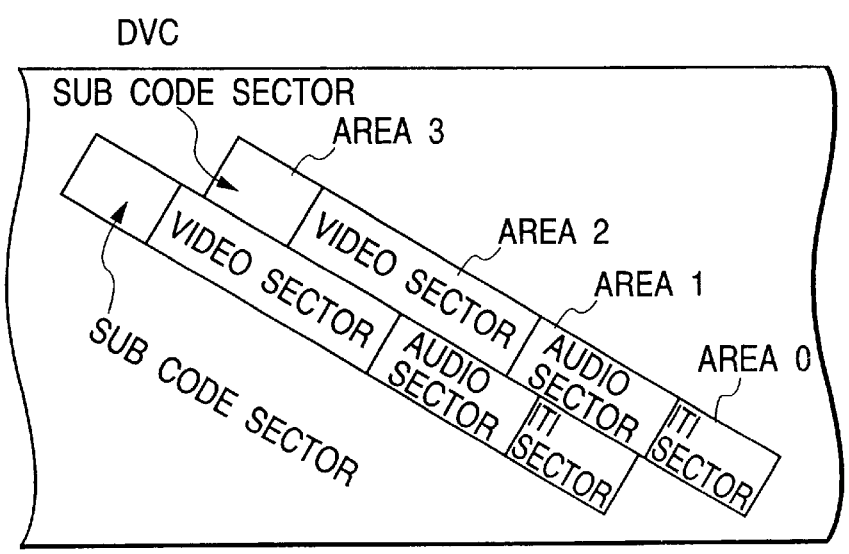

FIG. 3 is a flowchart of processing performed during recording in the system control section 11 of the control apparatus 1. FIG. 4 is a flowchart of processing performed in the system control section 21 of VTR 2 in response to the operation of the control apparatus 1 shown in FIGS. 2 and 3.

In a step Si of FIG. 3, the control apparatus 1 processes the media information command including a type of a cassette loaded in the VTR 2, a tape grade, and a setting of the recording prohibit region. More specifically, the control apparatus 1 transmits a media information status command and waits for a response from the VTR 2. The media information status command, whose format is shown in FIG. 6A, comprises an 8-bit operation code (opcode) and two operands (operand [0] and operand [1]). In FIGS. 6A and 6B, "msb" and "lsb" stand for the most significant bit and the least significant bit, respectively. Furthermore, in this media information status command, "DA" is suffixed by "h" to indicate that "DA" is expressed by hexadecimal number. The operation code "DAh" indicates as a whole that its command or response relates to the media information. The operands [0] and [1] are both set to 7 Fh representing a command inquiring the media information to the VTR 2.

In a step S11 of FIG. 4, the VTR 2 receives the media information status command sent from the control apparatus 1 and interprets the content of this command to perform necessary response processing. More specifically, when the VTR 2 received the media information status command, the VTR 2 returns a media information response based on the information entered from the status input section 22. The media information response includes a cassette type information (operand [0]) and a tape grade and recording prohibit information (operand [1]) as shown in FIG. 6B.

FIG. 7 is a view illustrating a relationship between respective codes and their contents involved in the media information response. As described above, the operands [0] represents the cassette type and the operand [1] represents the tape grade and recording prohibit information. For example, when the operand [0] is 22h (i.e., [0]=22h), it indicates that the type of a loaded cassette is a VHS cassette. When the operand [1] is 40 (i.e., [1]=40h), it indicates that the tape grade is an S-VHS tape and recordable. Furthermore, when the operand [0] is 22h (i.e., [0]=22h) and the operand [1] is 51h (i.e., [1]=51h), the loaded cassettes is a VHS cassette accommodating a D-VHS tape being set to nonrecordable. When no cassette is loaded or an unknown cassette is load, the inquiry command 7 Fh is directly returned. As described above, another VTR 3 conforms to the DVC standards. When the VTR 3 received the media information status command, the cassette type is 31h or 32h.

Returning to the step S1 of FIG. 3, the control apparatus 1 interprets the content of the media information response returned from the VTR 2. Then, the control apparatus 1 performs processing necessary for displaying the response on the display unit 5 as well as processing necessary for storing the related data in a memory.

In the next step S2, the control apparatus 1 transmits an input signal mode command. As shown in FIG. 8A, the input signal mode command designates a recording mode of video signals entered through the input terminal 14 and recorded on the magnetic tape. FIG. 9 shows a relationship between the operand [0] of this command and a corresponding recording mode. For example, when the operand [0] is 00h (i.e., [0]=00h), the recording of the video signals (digital signal recording) progresses according to the standard mode (having a standard recording speed) suitable for the 525/60 type SD signals (standard definition signals conforming to the DVC standards). When the operand [0] is 04h (i.e., [0]=04h), the recording (digital signal recording) progresses according to a long time mode suitable for the 525/60 SD type signals. When the operand [0] is 10h (i.e., [0]=10h), the recording (digital signal recording) is performed by directly recording the MPEG bit stream at a data rate of 25 Mbps and a field frequency of 60 Hz. When the operand [0] is 05h (i.e., [0]=05h), the recording of the 525/60 type NTSC signals (i.e., analog signal recording) progresses according to a recording mode conforming to the VHS standards. When the operand [0] is 01h (i.e., [0]=01h), the recording (digital signal recording) of the MPEG bit stream and other digital information (recordable and reproducible in a VTR conforming to the D-VHS standards) progresses according to a mode conforming to the D-VHS standards. The operator can enter the data indicating the signal mode through the keyboard 12.

Furthermore, the control apparatus 1 transmits an input signal mode status command shown in FIG. 8B to inquire the present recording mode of the VTR 2.

The VTR 2 performs the receiving processing for the input signal mode command sent from the control apparatus 1 (refer to step S12 shown in FIG. 4), and performs the control according to the interpreted information. Furthermore, in this step S12, the VTR 2 performs the response processing in response to the input signal mode status command. The VTR 2 writes the data indicating the present recording mode into a corresponding operand, and returns it to the control apparatus 1.

In a step S3 of FIG. 3, the control apparatus 1 processes a recording speed command relating to a tape traveling speed (i.e., recording speed) during the recording in the VTR 2. More specifically, the control apparatus 1 transmits a recording speed command shown in FIG. 10A to designate the recording speed. Furthermore, the control apparatus 1 transmits a recording speed status command shown in FIG. 10B to inquire the recording speed of the VTR 2. FIGS. 11A, 11B and 11C show the operand [0] of each recording speed command and a corresponding content. FIG. 11A shows recording speeds corresponding to the DVC standards. For example, when the operand [0] is 6 Fh (i.e., [0]=6 Fh), it indicates that the recording speed is a standard speed with a track pitch 10 μm. When the operand [0] is 20h (i.e., [0]=20h), it indicates that the recording speed is a speed 32 suitable for a long time recording. FIG. 11B shows recording speeds corresponding to the D-VHS standards. For example, when the operand [0] is 6 Fh (i.e., [0]=6 Fh), it indicates that the recording speed is a standard speed. FIG. 11C shows recording speeds corresponding to the VHS standards. Operand values [0]=6 Fh, 20h, 21h indicate a standard speed, a ½ speed (LP mode) and a ⅓ speed (EP mode), respectively.

The VTR 2 receives the recording speed command or the recording speed status command sent from the control apparatus 1. Then, the VTR 2 performs the command receiving processing and/or the response processing responsive to the inquiry relating to the recording speed (refer to step S13 of FIG. 4). Furthermore, the VTR 2 sets the recording speed according to the designated value transmitted from the control apparatus 1.

In a step S4 of FIG. 3, the control apparatus 1 makes a judgement whether or not a selected mode is a digital signal recording mode for recording digital signals on a magnetic tape. When the selected mode is not the digital recording mode, the control flow of FIG. 3 proceeds to a step S6. When the selected mode is the digital recording mode, the control flow proceeds to a step S5 to perform the tape recording format command processing.

More specifically, as shown in FIG. 12, a total of nine operands [0] to [8] are prepared to precisely designate a recording mode of the digital signals recorded on the magnetic tape. FIG. 13 shows detailed format parameters used when the tape recording format command is transmitted to the VTR conforming to the D-VHS standards, i.e., the VTR 2 of this embodiment.

The operand [0] shown in FIG. 12 includes a field of a "media type" that stores the recording media type information, such as a tape grade information corresponding to D-VHS, S-VHS or VHS. For example, FIG. 13 shows the media type of "00001b" that represents a D-VHS tape, although "b" is a binary number.

Furthermore, FIG. 13 includes af[0] to af[9]. The af[0] indicates whether or not an ECC block size field (in the operand [3]) is usable. The af[1] indicates whether or not an ECC block numbe r field (in the operand [3]) is usable. The af[2] indicates whether or not a program mode field (in the operand [3]) is usable. The af[3] indicates whether or not a scanner rotation speed field (in the operand [3]) is usable. The af[4] indicates whether or not a 1.001 flag field (in the operand [4]) is usable. The af[5] indicates whether or not an outer interleave field (in the operand [4]) is usable. The af[6] indicates whether or not a recording mode field (in the operand [4]) is usable. The af[7] indicates whether or not an application ID field (in the operand [6]) is usable. The af[8] indicates whether or not an application ID detailed information field (in the operand [7]) is usable. And, the af[9] indicates whether or not a time-axis compression rate field (in the operand [7]) is usable.

The ECC block size field stores a block size of an error correcting code (ECC), i.e., error-correcting code related information. For example, according to the MPEG2 standard mode of D-VHS, the value "0" indicates that the ECC block size is 112 sync blocks. The ECC block number field stores an ECC block number per track, i.e., error-correcting code related information. For example, according to the MPEG2 standard mode of D-VHS, the value "000b" indicates that the ECC block size is 3 blocks per track. The program mode field stores an arrangement of a main code area, i.e., digital information's arrangement related information. For example, according to the MPEG2 standard mode of D-VHS, the value "000b" indicates that the main code area arrangement is one program per track. The scanner rotation speed field stores a rotational speed of a rotary head. For example, according to the MPEG2 standard mode of D-VHS, the value "000b" indicates that the rotary head speed is 1,800 rpm. The 1.001 flag field indicates whether or not the scanner rotation speed is 59.94 Hz (i.e., whether or not the actual rotary head speed is $\frac{1}{1.0001}$ of the rotational speed indicated in the scanner rotation speed field).

Furthermore, the outer interleave field stores the number of tracks constituting an interleave block of the outer error-correcting code. For example, according to the MPEG2 standard mode of D-VHS, the value "000b" indicates that the track number is 6 tracks. The recording mode field stores the present recording mode, such as a MPEG2 standard mode, a high fine mode suitable for recording with a data rate twice the data rate of the standard mode, or a long time mode suitable for elongating the recording time, i.e., recording time related information or data rate related information. For example, the value "0000b" represents the standard mode. The application ID field, that is a field for defining a main code area and a sub code area, specifies a logic format of the recording media, i.e., digital information's arrangement related information. For example, according to the MPEG2 standard mode of D-VHS, the value "00000b" represents a format for MPEG2 signals. The application ID detailed information field stores a type of information recorded in the main code area, i.e., digital information's arrangement related information. For example, according to the MPEG2 standard mode of D-VHS, the value "000b" represents a MPEG2 transport stream. The time-axis compression rate field stores a time-axis compression rate of the recorded data, i.e., time-axis compression rate related information of the digital data. For example, according to the MPEG2 standard mode of D-VHS, the value "0000b" indicates that the recorded data is not subjected to the time-axis compression.

An extension code "A" field, an extension "B" field, and reserve fields are provided for future use when a more detailed designation is required.

In response to the tape recording format command sent from the control apparatus 1, the VTR 2 performs the command receiving processing (refer to step S15 of FIG. 4) and performs a control according to the interpreted information.

In a step S6 of FIG. 3, the control apparatus 1 performs area mode command processing for designating a recording area of the input signal. FIG. 14A shows a detailed area mode command. In the format shown in FIG. 14A, a media type field indicates a tape grade, such as D-VHS, S-VHS, or VHS. An area number is the information used for specifying a recording region of the input signal. FIG. 15 shows a detailed relationship between area codes and recording areas defined in accordance with the DVC standards, D-VHS standards, and VHS standards. The recording region on the D-VHS tape is divided into a total of four areas AREA0~AREA3. Similarly, the recording region on the DVC tape is divided into a total of four areas AREA0~AREA3. For example, when the media type is D-VHS tape and the area number is 2, the area mode command designates that the input signal is recorded into the main code area (AREA2). Furthermore, when the media type is DVC tape and the area number is 1, the area mode command designates that the input signal is recorded into the audio sector (AREA1).

One recording area designated by the area number (i.e., one of AREA0~AREA7) is further dividable into eight sections at maximum. Furthermore, the format shown in FIG. 14A includes part[0]part[7] each indicating whether a corresponding divided section is recordable or nonrecordable (rewrite prohibited) or whether the VTR 2 can freely determine it (Don't Care). For example, the value "00b" represents that the concerned section is recordable. The value "01b" represents "recording prohibited" and the value "11b" represents "Don't Care".

Furthermore, there is a possibility that the control apparatus 1 may transmit an inquiry to the VTR 2 to inquire the media type and recoding prohibit condition of each region on a tape. In such a case, the control apparatus 1 transmits an area mode status command in the step S6 of FIG. 3. FIG. 14B shows a format of the area mode status command. Then, the control apparatus 1 waits for a response returned from the VTR 2. When the response is returned from the VTR 2, the control apparatus 1 interprets the content of the response and performs processing necessary for displaying the response on the display unit 5 as well as processing necessary for storing the related data in the memory.

FIG. 16 shows designation of combined recording regions. For example, a combined area AREA (2+3) designates both a video sector and a sub code sector according to the DVC standards, or both a main code area and a sub code area according to the D-VHS standards. When a plurality of recording areas are combined, one of area numbers of the combined areas is selected as a representative area number in the area mode command. The remaining recording areas, not selected as the representative area, are designated by a recording command that is later described with reference to FIG. 17.

When the VTR 2 receives the area mode command, the VTR 2 performs a control according to the interpreted content. When the VTR 2 receives the area mode status command, the VTR 2 performs the response processing for returning a response to the control apparatus 1. In this case, the VTR 2 reads cassette information from a loaded cassette and writes a media type and a recording prohibit setting into corresponding fields (refer to step S16 of FIG. 4).

Returning to the flowchart of FIG. 3, in a step S7, the control apparatus 1 performs recording command processing to transmit a recording command C2h shown in FIG. 17. More specifically, a preferable recording mode is designated according to the value of the operand [0] of the recording command as shown in FIG. 18. For example, when the operand [0] is 31h (i.e., [0]=31h), an insert recording (rewriting) for AREA (2+3) is designated. When the operand [0] is 42h (i.e., [0]=42h), a pose at an insert recording (rewriting) mode for AREA 1 is designated. When the operand [0] is 75h (i.e., [0]=75h), an ordinary recording (rewriting) mode for the entire region is designated.

When the VTR 2 receives the recording command, the VTR 2 performs a recording operation in accordance with the interpreted content (refer to step S17 of FIG. 4).

According to the above-described first embodiment, the input signal mode command or the tape recording format command is transmitted via the 1394 interface bus 8 from the control apparatus 1 to designate the recording mode on the magnetic tape serving as a recording media. Accordingly, it becomes possible to improve the usability of the information recording system including a recording apparatus, such as a VTR conforming to the D-VHS standards, which has the capability of recording various input signals according to various recording modes. Furthermore, it is preferable that the VTR 2 has a block that converts the MPEG2 bit stream into an NTSC signal. This makes it possible to designate an analog recording of the converted NTSC signal.

Furthermore, the area mode command and the recording command are transmitted via the 1394 interface bus 8 from the control apparatus 1 to perform the recording (rewriting) on a specific region of the magnetic tape. Thus, it becomes possible to perform the control for rewriting part of a plurality of recording regions on the magnetic tape.

Furthermore, according to the above-described first embodiment, the control apparatus 1 can send an inquiry to the VTR 2 by using the media information status command. For example, it is possible to check a type of a loaded cassette, a grade of a magnetic tape accommodated in the loaded cassette, and a recording prohibit setting. In accordance with a response returned from the VTR 2, the control apparatus 1 can transmit the commands properly. The present invention is not limited to the above-described first embodiment and therefore can be modified variously.

For example, the control apparatus 1 can control the VTR 3 as well as the VTR 2. Furthermore, it is possible to control the operation of the VTR 2 by the VTR 3 when the VTR 3 has a command transmitting function in the same manner as the control apparatus 1.

Furthermore, although only the recording operation is explained in the above-described first embodiment, it is possible to utilize the area mode command for reproducing a specific region on the magnetic tape.

Furthermore, the information recording apparatus of the present invention is not limited to the VTR and therefore can be replaced by any other comparable recording media, such as a magneto-optic disc.

Furthermore, the digital interface bus is not limited to the 1394 interface bus and therefore can be replaced by any other comparable interface bus.

As explained in the foregoing description, according to the information recording system or its control method of the first embodiment, an appropriate command is transmitted via the digital signal bus from the external electronic apparatus to the information recording apparatus for designating a preferable recording mode or recording region for recording the input information on the recording media. The information recording apparatus performs the control in accordance with the content of the received command. Thus, it becomes possible to provide an improved and easily usable information recording apparatus capable of recording various input signals in accordance with various recording modes and/or capable of realizing a flexible recording by designating a specific region of the plurality of recording regions.

Second Embodiment

Hereinafter, a second embodiment of the present invention will be explained with reference the attached drawings. Like the first embodiment, the second embodiment is realized in the interactive data transmission system shown in FIGS. 1 and 2.

In the second embodiment, the VTR 3 comprises a system control section, a status input section and an interface substantially identical with those of the VTR 2 shown in FIG. 2. For example, the VTR 3 can be used as an information transport apparatus that reproduces the information already recorded in a magnetic tape and outputs the reproduced information via the bus 8. The VTR 2 records the information transmitted from the VTR 3.

Hereinafter, an operation of the interactive data transmission system shown in FIG. 1 according to the second embodiment will be explained based on a case where the VTR 3 serving as the information transport apparatus supplies video signals and audio signals (or digital signals other than audio data) to the VTR 2, and a recording of the supplied data in the VTR 2 is controlled by the control apparatus 1.

Figure 19:
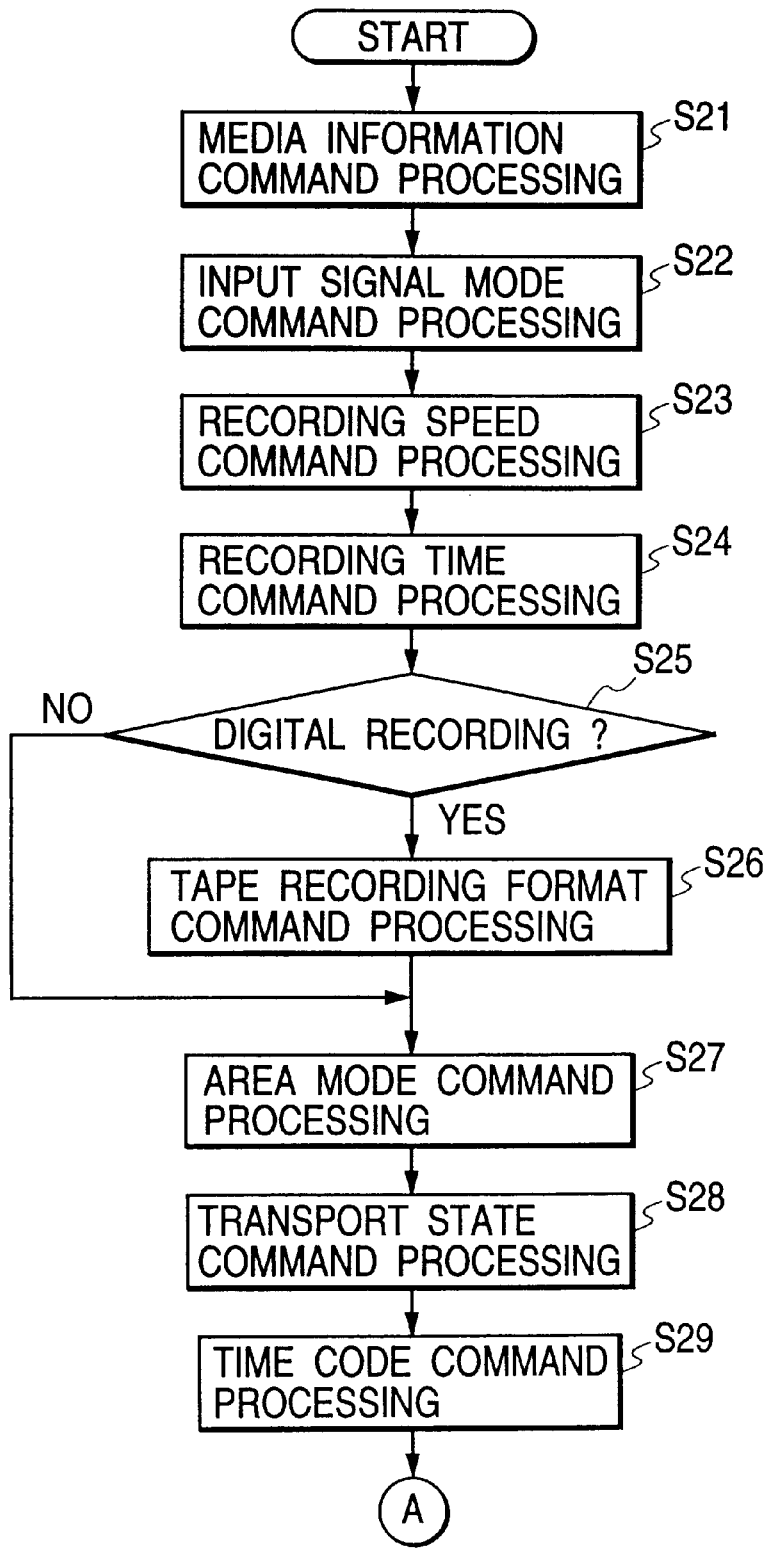
FIG. 19 is the first half of a flowchart showing the control processing performed in the control apparatus shown in FIG. 2 in accordance with a second embodiment of the present invention.
Figure 20:
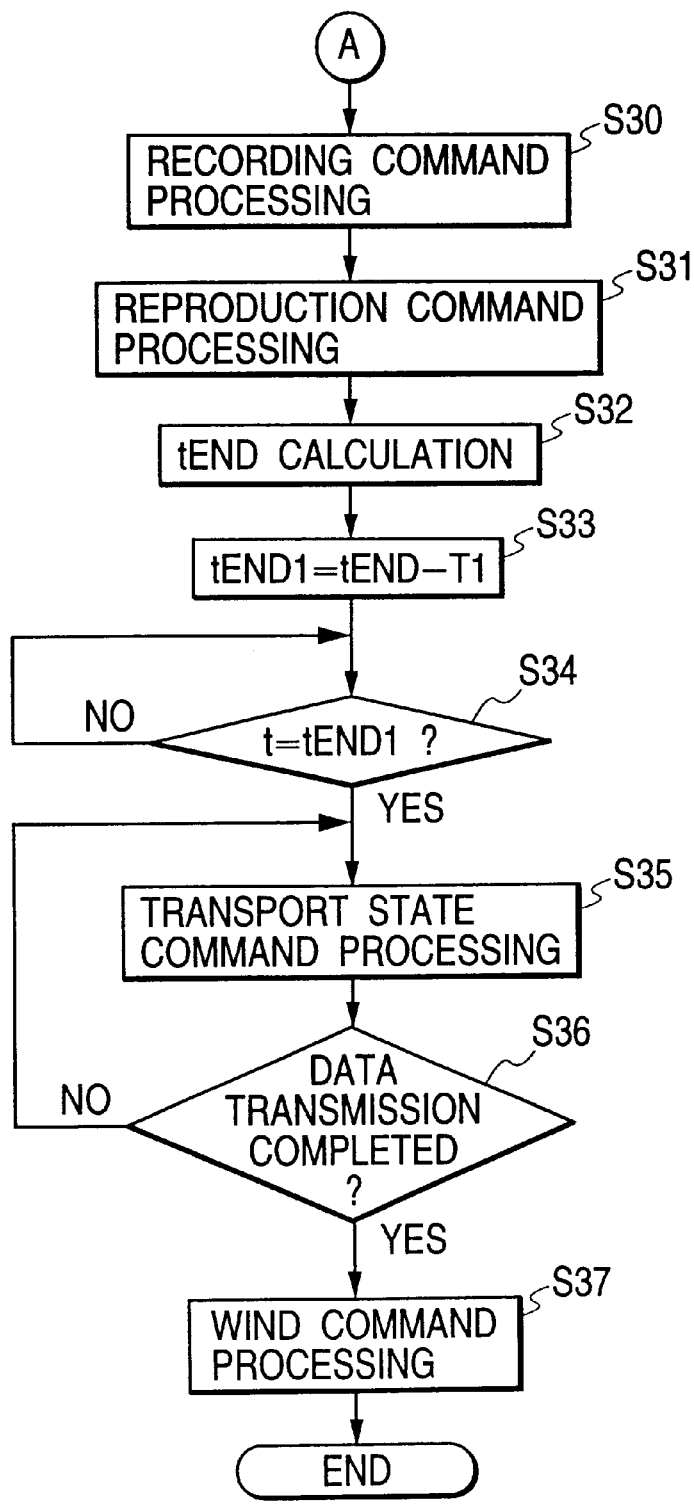
FIG. 20 is the second half of the flowchart showing the control processing performed in the control apparatus shown in FIG. 2 in accordance with second embodiment of the present invention.
Figure 21:
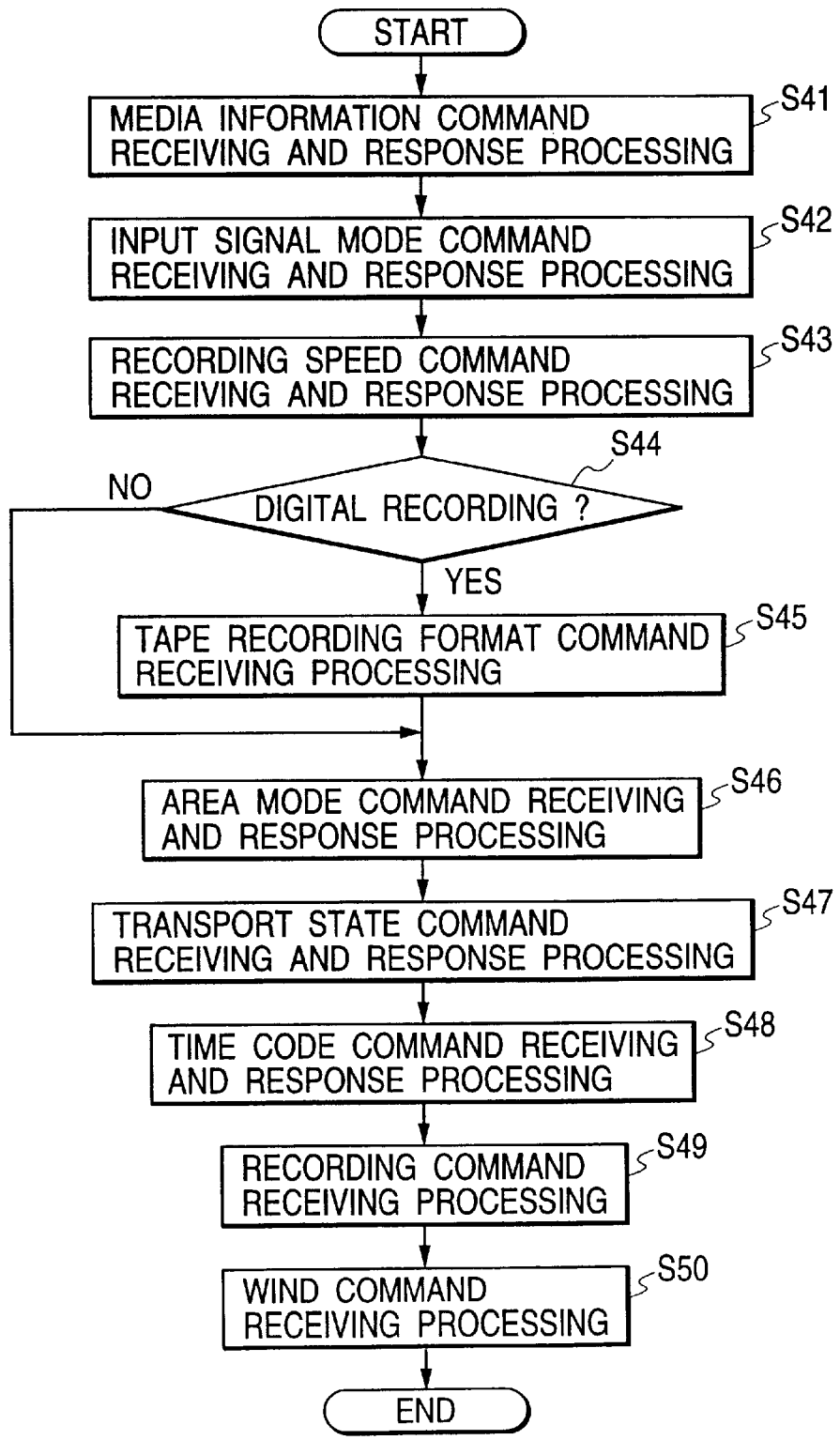
FIG. 21 is a flowchart showing the control processing performed in the VTR shown in FIG. 2 in accordance with the second embodiment of the present invention.

FIGS. 19 and 20 cooperatively show a flowchart of processing performed during recording in the system control section 11 of the control apparatus 1. FIG. 21 is a flowchart of processing performed in the system control section 21 of VTR 2 in response to the operation of the control apparatus 1 shown in FIGS. 19 and 20. FIG. 22 is a flowchart of processing performed in the system control section (not shown) of VTR 3 in response to the operation of the control apparatus 1 shown in FIGS. 19 and 20.

Steps S21, S22, S23, S25, S26, S27 and S30 of FIGS. 19 and 20 perform the same processing as those of the above-described steps S1, S2, S3, S4, S5, S6 and S7 of the first embodiment shown in FIG. 3, respectively.

The control apparatus 1 transmits a media information status command shown in FIG. 6A and waits for a response from the VTR 2.

Steps S41, S42, S43, S44, S45, S46 and S49 of FIG. 21 perform the same processing as those of the above-described steps S11, S12, S13, S14, S15, S16 and S17 of the first embodiment shown in FIG. 4, respectively.

In the step S41 of FIG. 21, the VTR 2 receives the media information status command sent from the control apparatus 1 and interprets the content of this command to perform necessary response processing. More specifically, when the VTR 2 received the media information status command, the VTR 2 returns a media information response shown in FIG. 6B based on the information entered from the status input section 22.

The relationship between respective codes and their contents involved in the media information response is shown in FIG. 7.

Returning to the step S21 of FIG. 19, the control apparatus 1 interprets the content of the media information response returned from the VTR 2. Then, the control apparatus 1 performs processing necessary for displaying the interpreted response on the display unit 5 as well as processing necessary for storing the related data in a memory.

In the next step S22, the control apparatus 1 transmits an input signal mode command shown in FIG. 8A. The relationship between the operand [0] of this command and a corresponding recording mode is shown in FIG. 9.

Furthermore, the control apparatus 1 transmits an input signal mode status command shown in FIG. 8B to inquire the present recording mode of the VTR 2.

The VTR 2 performs the receiving processing for the input signal mode command sent from the control apparatus 1 (refer to step S42 shown in FIG. 21), and performs the control according to the interpreted information. Furthermore, in this step S42, the VTR 2 performs the response processing in response to the input signal mode status command. The VTR 2 writes the data indicating the present recording mode into a corresponding operand, and returns it to the control apparatus 1.

In the step S23 of FIG. 19, the control apparatus 1 processes a recording speed command relating to a tape traveling speed (i.e., recording speed) during the recording in the VTR 2. More specifically, the control apparatus 1 transmits a recording speed command shown in FIG. 10A to designate the recording speed. Furthermore, the control apparatus 1 transmits a recording speed status command shown in FIG. 10B to inquire the recording speed of the VTR 2. The relationship between the operand [0] of each recording speed command and a corresponding content is shown in FIGS. 11A, 11B and 11C.

The VTR 2 receives the recording speed command or the recording speed status command sent from the control apparatus 1. Then, the VTR 2 performs the command receiving processing and/or the response processing responsive to the inquiry relating to the recording speed (refer to step S43 of FIG. 21). Furthermore, the VTR 2 sets the recording speed according to the designated value transmitted from the control apparatus 1.

In a step S24 of FIG. 19, the control apparatus 1 performs the recording time command processing of specific information recorded on the recording tape. More specifically, the control apparatus 1 transmits a recording time status command shown in FIG. 23A to the VTR 3 to inquire a recording time of the specific information recorded in the cassette loaded in the VTR 3.

The VTR 3 performs the recording time command receiving and response processing in response to the recording time status command sent from the control apparatus 1 (refer to step S61 of FIG. 22). More specifically, the VTR 3 receives the recording time status command and interprets the content of this command. Then, the VTR 3 performs the response processing for transmitting a recording frame number and a recording time (hour, minute, second) of the specific information recorded on the loaded cassette according to the format shown in FIG. 23B. When a response is returned from the VTR 3, the control apparatus 1 interprets the content of the response and then performs processing necessary for displaying the interpreted response on the display unit 5 as well as processing necessary for storing the related data in a memory.

In a step S25 of FIG. 19, the control apparatus 1 makes a judgement whether or not a selected mode is a digital signal recording mode for recording digital signals on a magnetic tape. When the selected mode is not the digital recording mode, the control flow of FIG. 19 proceeds to a step S27. When the selected mode is the digital recording mode, the control flow proceeds to a step S26 to perform the tape recording format command processing.

The recording mode of the digital signals recorded on the magnetic tape can be precisely designated using the nine operands [0] to [8] shown in FIG. 12. FIG. 13 shows the detailed format parameters used when the tape recording format command is transmitted to the VTR2 conforming to the D-VHS standards.

In response to the tape recording format command sent from the control apparatus 1, the VTR 2 performs the command receiving processing (refer to step S45 of FIG. 21) and performs a control according to the interpreted information.

In the step S27 of FIG. 19, the control apparatus 1 performs the area mode command processing for designating a recording area of the input signal. More specifically, the control apparatus transmits the area mode command shown in FIG. 14A to the VTR 2. The detailed relationship between area codes and recording areas defined in accordance with the DVC standards, D-VHS standards, and VHS standards are shown in FIG. 15.

Furthermore, in the same step S27 of FIG. 19, the control apparatus 1 can transmit the area mode status command sown in FIG. 14B. Then, the control apparatus 1 waits for a response returned from the VTR 2. When the response is returned from the VTR 2, the control apparatus 1 interprets the content of the response and performs processing necessary for displaying the response on the display unit 5 as well as processing necessary for storing the related data in the memory.

The combinations shown in FIG. 16 are referred to when a plurality of recording areas are designated.

When the VTR 2 receives the area mode command, the VTR 2 performs a control according to the interpreted content. When the VTR 2 receives the area mode status command, the VTR 2 performs the response processing for returning a response to the control apparatus 1. In this case, the VTR 2 reads cassette information from a loaded cassette and writes a media type and a recording prohibit setting into corresponding fields (refer to step S46 of FIG. 21).

Returning to step S28 of FIG. 19, the control apparatus 1 performs the transport state command processing for inquiring the operation conditions of the VTRs 2 and 3. More specifically, the control apparatus 1 transmits a transport state status command shown in FIG. 24A to the VTRs 2 and 3. In response to the transport state status command, each of the VTRs 2 and 3 interprets the content of the received transport state status command and performs the response processing for returning a response to the control apparatus 1. FIG. 24B shows a format of the response returned to the control apparatus 1 that includes the information relating to the present operating condition of each VTR (refer to step S47 of FIG. 21 and step S62 of FIG. 22).

FIG. 25 is a view illustrating the details of an operation code (Opcode) (transport mode) involved in a response to a transport state status command, as well as a value of the operand [0] (transport state) and its content. For example, when the operation code is C1h and the operand [0] is 60h, it indicates that no cassette (recording media) is loaded. When the operation code is C2h and the operand [0] is 75h, it indicates that an ordinary recording (i.e., overwriting in an entire recording region of a magnetic tape) is progressing. When the operation code is C2h and the operand [0] is 30h, it indicates that one of a plurality of insert modes is progressing. Furthermore, when the operation code is C3h and the operand [0] is 75h, it indicates that an ordinary reproduction (i.e., reproduction at a tape speed identical with the tape speed during the recording) is progressing. When the operation code is C3h and the operand [0] is 31h, it indicates that one of a plurality of slow (forward) modes is progressing. When the operation code is C4h and the operand [0] is 60h, it indicates an ordinary stopped condition. When the operation code is C4h and the operand [0] is 65h, it indicates that a rewinding is progressing.

Returning to FIG. 19, in step S29, the control apparatus 1 performs the time code command processing for designating time codes that are recorded on the magnetic tapes loaded in the VTRs 2 and 3 to search the designated time codes. More specifically, the control apparatus 1 transmits a time code command shown in FIG. 26A to cause each VTR 2 or 3 to forward or rewind the loaded magnetic tape to a target position (i.e., a position designated by the time code). In response to this time code command, each VTR 2 or 3 performs the time code command processing to forward or rewind the loaded magnetic tape to the designated position (refer to step S48 of FIG. 21 and step S63 of FIG. 22). Furthermore, the control apparatus 1 can transmit a time code status command shown in FIG. 26B to inquire a present time code of the magnetic tape loaded in each VTR 2 or 3. In response to this time code status command, each VTR 2 or 3 performs the response processing for returning a response to the control apparatus 1. The format of the response is identical with that of the command shown in FIG. 26A.

After finishing step S29 of FIG. 19, the control apparatus 1 perform the recording command processing in a step S30 of FIG. 20 for transmitting a recording command to the VTR 2. Then, in a step S31, the control apparatus 1 performs the reproduction command processing for transmitting a reproduction command to the VTR 3. The recording command designates a preferable recording mode from FIG. 18 according to the value of the operand [0] shown in FIG. 17. For example, when the operand [0] is 31h (i.e., [0]=31h), an insert recording (rewriting) for AREA (2+3) is designated. When the operand [0] is 42h (i.e., [0]=42h), a pose at an insert recording (rewriting) mode for AREA 1 is designated. When the operand [0] is 75h (i.e., [0]=75h), an ordinary recording (rewriting) for the entire region is designated.

When the VTR 2 receives the recording command, the VTR 2 performs a recording operation in accordance with the interpreted content (refer to step S49 of FIG. 21).

Furthermore, the reproduction command shown in FIG. 27 designates a preferable reproduction mode according to the value of the operand [0]. For example, when the operand [0] is 75h (i.e., [0]=75h), the reproduction command designates an ordinary reproduction mode (i.e., reproduction at a tape speed identical with the tape speed during the recording). When the operand [0] is 31h (i.e., [0]=31h), the reproduction command designates a slow reproduction mode in a forward direction. When the operand [0] is 4Fh (i.e., [0]=4Fh), the reproduction command designates a search reproduction mode in a backward direction.

When the VTR 3 received the reproduction command, the VTR 3 performs a reproduction operation according to the interpreted content of the received reproduction command (refer to step S64 of FIG. 22). Accordingly, the information recorded in the magnetic tape loaded in the VTR 3 is reproduced. The reproduced information is sent via the bus 8 to the VTR 2 that starts the recording operation. The VTR 2 records the information sent from the VTR 3.

Returning to FIG. 20, in a step S32, the control apparatus calculates an expected information transport end time tEND based on a recording time of specific information recorded on a magnetic tape loaded in the VTR 3 and an information transport start time of the VTR 3. The recording time of the specific information is obtained from a response returned from the VTR 3 in the step S24 of FIG. 19. Next, in a step S33, the control apparatus 1 calculates a just before end time tEND1 earlier a predetermined time ΔT (e.g., 1~2 minutes) before the expected information transport end time tEND (i.e., tEND1=tEND−ΔT). Then, in a step S34, the control apparatus 1 makes a judgement whether or not the present time is equal to the obtained just before end time tEND1. If the judgement is NO in the step S34, the control apparatus 1 repeats the same judgement. When the present time becomes the just before end time tEND1, the control apparatus 1 transmits a transport state status command to the VTR 3 to inquire the operating condition of the VTR 3 (step S35).

The VTR 3 receives the transport state status command sent from the control apparatus 1, and performs the response processing for replying to the inquiry relating to the operating condition (refer to step S65 of FIG. 22). More specifically, the control apparatus 1 transmits the transport state status command to the VTR 3 at predetermined intervals (for example, every 1 minute). According to this embodiment, the specific information stops at a terminal end of the magnetic tape loaded in the VTR 3. The operation mode of the VTR 3 is automatically changed to a stop mode at the terminal end of the magnetic tape. Hence, to realize a quick detection of the transfer to the stop mode in the VTR3, the control apparatus 1 transmits the transport state status command within a relatively short period of time starting from the time tEND1 earlier than the expected information transport end time tEND.

With this arrangement, it becomes possible to quickly and accurately detect an actual end timing of the data transmission.

The control apparatus 1 receives the response from the VTR 3 and checks whether or not the data transmission from the VTR 3 is stopped, i.e., whether or not the operation mode is changed to the stop mode (refer to step S36 of FIG. 20). When the data transmission from the VTR 3 is not finished, the control flow of FIG. 20 returns to the step S35. When the data transmission from the VTR 3 is completed, the control apparatus 1 performs the wind command processing for transmitting a wind command to the VTR 2 (refer to step S37).

FIG. 28 shows the details of the wind command. The wind command is used to designate "stop (operand [0](wind mode)=60h)", "rewind (operand [0]=65h)" and "fast forwarding (operand [0] =75h) shown in FIG. 25." In the step S37, the control apparatus 1 transmits the wind command for stopping the operation of VTR 2. The VTR 2 receives the wind command and stops the recording operation to transfer to the stop mode (refer to step S50 of FIG. 21).

As described above, according to the above-described second embodiment, the transport state status command is transmitted to the VTR 3 serving as the information transport apparatus. The transmission of the transport state status command starts from the time tEND1 that is earlier than the expected information transport end time tEND. This is effective to reduce the total number of the command transmitting operations. Furthermore, it is possible to quickly detect a change of the operating condition of the VTR 3, i.e., completion of the data transmission. As a result, the recording operation of the VTR 2 can be stopped at an appropriate timing.

The present invention is not limited to the above-described second embodiment and therefore can be modified variously. Transmit timing of the transport state command can be modified from the above-described embodiment wherein it is transmitted from the just before end time tEND1 to inquire the operating condition of the VTR 3. For example, it is possible to transmit the transport state command every 20 minutes during a time earlier than the just before end time tEND1 and transmit the same every 1 minute after the time tEND. This modification can reduce the total number of the transmission of the transport state status command and can quickly detect the completion of the data transmission.

Furthermore, although the above-described second embodiment discloses the VTRs 2 and 3 controlled by the control apparatus 1, it is possible to modify the electronic data transmission system so as to control the operation of the VTR 3 by the VTR 2 when the VTR 2 has a command transmitting function in the same manner as the control apparatus 1.

Furthermore, the information transport apparatus of the present invention is not limited to the VTR and therefore can be replaced by any other comparable recording media, such as a magneto-optic disc. Furthermore, the digital interface bus is not limited to the 1394 interface bus and therefore can be replaced by any other comparable interface bus.

As explained in the foregoing description, according to the electronic data transmission system or the control method of the second embodiment, the expected information transport end time is calculated based on the information relating to a time required for transmitting the specific information. The specific information is involved in the response from the information transport apparatus. From a predetermined time earlier than the expected information transport end time, the control apparatus starts transmitting the command inquiring the operating condition of the information transport apparatus. Thus, it becomes possible to effectively transmit the operating condition inquiring command and detect the actual completion of the data transmission.

Furthermore, according to the electronic data transmission system or the control method of the second embodiment, the expected information transport end time is calculated based on the information relating to the time required for transmitting the specific information involved in the response from the information transport apparatus. During a period of time starting from the predetermined time earlier than the expected information transport end time, the control apparatus transmits the operating condition inquiring command to the information transport apparatus at intervals shorter than the intervals being set before this period of time. Thus, it becomes possible to obtain the same effects as those described above.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. an information recording system comprising:
   an information recording apparatus which selectively records incoming digital or analog signals on recording media loaded therein so that both digital type recording media and analog type recording media can be used in said information recording apparatus; and
   at least one external electronic apparatus connected to said information recording apparatus via a bus transmitting digital signals, wherein
   said external electronic apparatus comprising a command transmitting means for sending first, second, third and fourth commands to said information recording apparatus via said bus, said first command inquiring the type of recording media loaded in said information recording apparatus, said second command designating digital signal or analog signal as a signal type of information to be recorded on said recording media, said third command designating a track pitch required when signals are recorded on said recording media, and said fourth command designating a recording rate required for recording the digital signals, said information recording apparatus comprises a command receiving means for receiving said command sent from said external electronic apparatus and interpreting the content of the received command, a response transmitting means for sending a response replying to the interpreted command content to said external electronic apparatus via said bus, and a control means for performing a control according to the interpreted command content, and said external electronic apparatus, after sending said first command, sends said second command in response to a judgement result of detecting whether said recording media loaded in said information recording apparatus is the digital type recording media dedicated for recording digital signals or the analog type recording media dedicated for recording analog signals, sends said third command when the recording media loaded in said information recording apparatus is the analog type recording media, and sends said fourth command when the recording media loaded in said information recording apparatus is the digital type recording media.

2. An external electronic apparatus connected to an information recording apparatus via a bus transmitting digital signals, said information recording apparatus selectively recording incoming digital or analog signals on recording media loaded therein so that both digital type recording media and analog type recording media and analog type recording media can be used in said information recording apparatus,
   wherein said external electronic apparatus comprises a command transmitting means for sending first, second, third and fourth commands to said information recording apparatus via said bus, said first command inquiring the type of recording media loaded in said information recording apparatus, said second command designating digital signal or analog signal as a signal type of information to be recorded on said recording media, said third command designating a track pitch required when signals are recorded on said recording media, and said fourth command designating a recording rate required for recording the digital signals; and
   said external electronic apparatus sends, after sending said first command, said second command in response to a judgement result of detecting whether said recording media loaded in said information recording apparatus is the digital type recording media dedicated for recording digital signals or the analog type recording media dedicated for recording analog signals, sends said third command when the recording media loaded in said information recording apparatus is the analog type recording media, and sends said fourth command when the recording media loaded in said information recording apparatus is the digital type recording media.

3. The external electronic apparatus in accordance with claim 2, wherein said first command inquires a grade of analog type recording media as well as the type of said recording media loaded in said information recording apparatus, and said command transmitting means sends said first command to said information recording apparatus to judge the grade of the analog type recording media loaded in said information recording apparatus.

4. The external electronic apparatus in accordance with claim 2, wherein said fourth command designates a recording formal of digital signals when said digital signals are recorded on said recording media in addition to said recording rate required for recording the digital signals.

5. The external electronic apparatus in accordance with claim 3, wherein said fourth command designates a recording format of digital signals when said digital signals are recorded on said recording media in addition to said recording rate required for recording the digital signals.

6. An information recording apparatus for selectively recording incoming digital or analog signals on recording media so that both digital type recording media and analog type recording media can be used in said information recording apparatus and connectable to an external electronic apparatus via a bus transmitting digital signals, wherein said information recording apparatus comprises:

a command receiving means for receiving a first command and succeeding second, third and fourth commands which are sent from said external electronic apparatus and then interpreting the content of the received commands, said first command inquiring the type of recording media loaded in said information recording apparatus, said second command designating digital signal or analog signal as a signal type of information to be recorded on said recording media, said third command designating a track pitch required when signals are recorded on said recording media, and said fourth command designating a recording rate required for recording the digital signals, a response transmitting means for sending a response replying to the interpreted command content to said external electronic apparatus via said bus, so that said external electronic apparatus can send said second command in response to said response, and a control means for performing a control according to the interpreted command content, wherein said information recording apparatus sets the recording rate according to said fourth command when the recording media loaded in said information recording apparatus is the digital type recording media.

7. The information recording apparatus in accordance with claim 6, wherein said first command inquires a grade of analog type recording media as well as inquires the type of said recording media loaded in said information recording apparatus, and said response transmitting means sends information relating to the grade of said analog type recording media loaded in said information recording apparatus.

8. The information recording apparatus in accordance with claim 7, wherein said fourth command received by said command receiving means designates a recording format of digital signals when said digital signals are recorded on said recording media in addition to said recording rate required for recording the digital signals; and said control means sets the recording rate and the recording format of the digital signals in accordance with the content of said fourth command when said digital signals are recorded on said recording media.

9. The information recording apparatus in accordance with claim 6, wherein said fourth command received by said command receiving means designates a recording formal of digital signals when said digital signals are recorded on said recording media in addition to said recording rate required for recording the digital signals, and said control means sets the recording rate and the recording format of the digital signals in accordance with the content of said fourth command when said digital signals are recorded on said recording media.

10. A control method for an information recording apparatus controlled by an external electronic apparatus in an information recording system, said information recording system comprising the information recording apparatus and at least one external electronic apparatus connected to said information recording apparatus via a bus transmitting digital signals, said information recording apparatus selectively recording incoming digital or analog signals on recording media loaded therein so that both digital type recording media and analog type recording media can be used in said information recording apparatus, and said control method comprising:

a first step of sending a first command to said information recording apparatus via said bus, said first command inquiring the type of recording media loaded in said information recording apparatus;

a second step of identifying the type of said recording media loaded in said information recording apparatus based on a response of said information recording apparatus replying to said first command; and a third step of sending a second command to said information recording apparatus via said bus in response to the judgement result of said second step, said second command designating digital signal or analog signal as a signal type of information to be recorded on said recording media, a fourth step of sending a third command to said information recording apparatus via said bus when the recording media loaded in said information recording apparatus is the analog type recording media, said third command designating a track pitch required when signals are recorded on said recording media, and a fifth step of sending a fourth command to said information recording apparatus via said bus when the recording media loaded in said information recording apparatus is the digital type recording media, said fourth command designating a recording rate required for recording the digital signals.

11. The control method in accordance with claim 10, wherein said fourth command sent in aid fifth step further designates a recording format of digital signals when said digital signals are recorded on said recording media.

* * * * *